(12) United States Patent
Zhao

(10) Patent No.: US 7,391,179 B2
(45) Date of Patent: Jun. 24, 2008

(54) MUTUAL INDUCTANCE CONTACTLESS STARTER

(75) Inventor: Yunwen Zhao, Jiangsu (CN)

(73) Assignee: Changshu Tianyin Electromechanical Co., Ltd., Jiangsu (CN)

( * ) Notice: Subject to any disclaimer, the term of this patent is extended or adjusted under 35 U.S.C. 154(b) by 64 days.

(21) Appl. No.: 11/579,245

(22) PCT Filed: Apr. 27, 2005

(86) PCT No.: PCT/CN2005/000583

§ 371 (c)(1),
(2), (4) Date: Nov. 1, 2006

(87) PCT Pub. No.: WO2006/076833

PCT Pub. Date: Jul. 27, 2006

(65) Prior Publication Data

US 2007/0216336 A1  Sep. 20, 2007

(30) Foreign Application Priority Data

Jan. 21, 2005  (CN) .................. 2005 1 0038234

(51) Int. Cl.
*H02P 1/42* (2006.01)
(52) U.S. Cl. ........................... 318/788; 318/783
(58) Field of Classification Search .................. 318/778, 318/779, 781–788
See application file for complete search history.

(56) References Cited

U.S. PATENT DOCUMENTS

| | | | | |
|---|---|---|---|---|
| 3,671,830 A * | 6/1972 | Kruper | ..................... | 318/786 |
| 3,803,866 A * | 4/1974 | Barry | ..................... | 62/230 |
| 3,916,274 A | 10/1975 | Lewus | | |
| 4,052,648 A * | 10/1977 | Nola | ..................... | 318/810 |
| 4,467,257 A * | 8/1984 | Douthart et al. | ..................... | 318/774 |
| 4,820,964 A * | 4/1989 | Kadah et al. | ..................... | 318/786 |
| 6,570,359 B2 * | 5/2003 | Dubhashi | ..................... | 318/786 |
| 7,061,204 B2 * | 6/2006 | Unno | ..................... | 318/786 |

FOREIGN PATENT DOCUMENTS

| | | |
|---|---|---|
| CN | 1052228 A | 6/1991 |
| CN | 2234146 Y | 8/1996 |
| CN | 2239677 Y | 11/1996 |
| CN | 2412319 Y | 12/2000 |
| JP | 10-094279 | 4/1998 |

* cited by examiner

*Primary Examiner*—Bentsu Ro
(74) *Attorney, Agent, or Firm*—Knobbe, Martens, Olson & Bear, LLP

(57) ABSTRACT

An inductive contactless starter can be provided for single-phase AC motor, which can be designed to start a compressor motor with a starting capacitor or a common single-phase AC motor. The starter can comprise a current mutual-inductor composed of two primary coils and a secondary coil, a gate capacitor, a triac, and a Positive Temperature Coefficient (PTC) resistor. By sampling relevant current signals with the current mutual-inductor, the starter can effectively control heat loss of the current sampling system down to milliwatt level (i.e., the starter is a "zero power loss" starter for single-phase AC motor), and thereby can improve energy efficiency greatly. Additionally, the starter can have a simple circuit and fewer components, and is reliable, improving reliability of the motor starting system while delivering motor starting function.

1 Claim, 2 Drawing Sheets

MUTUAL INDUCTANCE CONTACTLESS STARTER

CROSS-REFERENCE TO RELATED APPLICATIONS

This application is a national stage application under 35 U.S.C. § 371 of PCT Application No. PCT/CN2005/000583 designating the United States, filed Apr. 27, 2005. The PCT Application was published in Chinese as WO 2006/076833 A1 on Jul. 27, 2006 and claims the benefit of the earlier filing date of Chinese Patent Application No. 200510038234.6, filed Jan. 21, 2005. The contents of Chinese Patent Application No. 200510038234.6 and International Application No. PCT/CN2005/000583 including the publication WO 2006/076833 A1 are incorporated herein by reference in their entirety.

TECHNICAL FIELD

The present inventions relate to inductive contactless starters mainly designed to start a compressor motor with a starting capacitor or a common single-phase AC motor.

BACKGROUND

Single-phase AC motors usually comprise a rotor and stator composed of primary and secondary windings. The secondary winding is not only used to start the motor but also work during normal operation of the motor. Therefore, the complete secondary winding circuit of a single-phase AC motor can be represented with a secondary winding operation circuit and a secondary winding starting circuit shunted to each other. A motor in which the secondary winding doesn't work during normal operation of the motor doesn't have the secondary winding operation circuit portion. Thus, in this type of motor, the secondary winding starting circuit portion only works at startup of the motor and has to be disconnected after motor startup.

In conventional motors, disconnection of the secondary winding starting circuit is usually implemented with a Positive Temperature Coefficient (PTC) component. When the motor starts, the starting circuit works, and the starting current in the secondary winding flows through the PTC component, causing the PTC component to generate heat and thus the resistance increases quickly, and finally disconnects the starting circuit. During normal operation of the motor, there is a small current passing through the PTC component persistently, to maintain the thermal resistance of the PTC component and thereby prevent the motor starting circuit from acting. The power loss for maintaining heat generation in the PTC component is usually about 3 W. Since such motors are widely used, the heat loss results in severe waste of electric energy.

In China Patent Application CN1052228A, an electronic circuit for starting single-phase inductive motors is disclosed. By utilizing a triac that gates on in normal state and gates off by timing in the motor starting circuit and associated gate-on/gate-off circuits, the switching of motor starting circuit from close at power-on to time-lagged open is implemented, and thereby motor startup is implemented. However, the amount of discrete components employed by the circuit has an extremely high demand for reliability in the typical application case, in which the motor has to start intermittently and frequently during long term operation, and it reduces the reliability of starting circuit to a great extent; especially, the working current of several milliamperes passes through the resistance components used in the gate-on circuit and multiple transistors used in the time-lagged gate-off circuit. Furthermore, the entire electronic circuit operates in the complex permanently operating circuit and is not isolated from the complex electrical environment effectively. As a result, the entire weak light-current circuit system is not protected well, bringing severe adverse effects to reliability of the entire motor system. In addition, the triac used in the circuit requires resetting the timer before the motor starting circuit is closed, i.e., the timer circuit must be cut off power so that the capacitor of the timer discharges for a certain time before the triac can gate off again after a time lag. Otherwise the triac will be always in gate-off state as long as there is current in the gate-on/time-lagged gate-off circuits, thereby preventing motor switching from non-operation low-current state to start state.

The invention disclosed in Japan Patent Document JP10094279 utilizes the principle that the current in a motor during startup is different to that in normal operation and utilizes a current detection resistor in the main motor circuit to convert the main circuit current (total current in motor) signal into a voltage signal. In addition, that invention utilizes a "reference current setter" and a "current comparison circuit" to compare the main circuit current signal with the preset current value, and uses the comparative result to control gate-on/gate-off of the triac connected in the motor starting circuit, and thereby attain the object of control open/close of the starting circuit. However, the resistor used in the circuit samples the current signal in the main motor circuit into a voltage signal. Since the resistor is a pure resistive component and the current in the main motor circuit is usually at ampere level or near ampere level, the resistor will cause heat loss at watt level or near watt level during the entire motor operation process. Though the circuit can start the motor, it degrades energy utilization ratio severely. Furthermore, the circuit utilizes auxiliary circuits such as "reference current setter" and "comparison circuit", all of which degrades reliability of motor startup function to a certain degree.

SUMMARY OF INVENTIONS

An object of at least some of the present inventions is to provide an inductive contactless starter for single-phase AC motor, featured with high reliability and low power loss.

Thus, in accordance with an embodiment, an inductive contactless starter for single-phase AC motor can be provided. The motor can comprise a stator composed of at least a primary winding and a secondary winding. A permanently operating capacitor can be connected between outlet terminals of the primary and secondary windings. The inductive contactless starter can comprise a current mutual-inductor composed of two primary coils and a secondary coil, a gate capacitor, a triac, and a PTC resistor. A first terminal of the secondary coil of the current inductor can be connected to a gate electrode of the triac, and a second terminal of the secondary coil can be connected to a first electrode of the triac, a terminal of the permanently operating capacitor, and a terminal of the first primary coil of the current inductor. A second terminal of the first primary coil of the current inductor can be connected to an outlet terminal of the secondary winding of the motor. A terminal of the second primary coil of the current mutual-inductor can be connected to a power input terminal and a terminal of the gate capacitor. A second terminal of the second primary coil of the current mutual-inductor can be connected to an outlet terminal of the primary winding of the motor, a second terminal of the permanently operating capacitor, and a second terminal of the gate capacitor. A first terminal of the PTC resistor can be connected to a second electrode of the triac. A second terminal of the PTC resistor can be connected to a terminal of a motor starting capacitor.

By sampling relevant current signals with the current mutual-inductor, the starter can effectively control heat loss of the current sampling system down to milliwatt level (i.e., the starter is a "zero power loss" starter for single-phase AC motor), and thereby improves energy efficiency greatly. In addition, the starter has a simple circuit and fewer components, and is reliable, improving reliability of the motor starting system while delivering motor starting function.

BRIEF DESCRIPTION OF THE FIGURES

The above-mentioned and other features of the inventions disclosed herein are described below with reference to the drawings of preferred embodiments. The illustrated embodiments are intended to illustrate, but not to limit the inventions. The drawings contain the following Figures.

DESCRIPTION OF THE PREFERRED EMBODIMENTS

Several embodiments of an inductive contactless starter for single-phase AC motor are shown in the part of the attached drawings enclosed by a polygon in dotted line, an associated motor MD being represented by a circle in dotted line.

Figure 1:
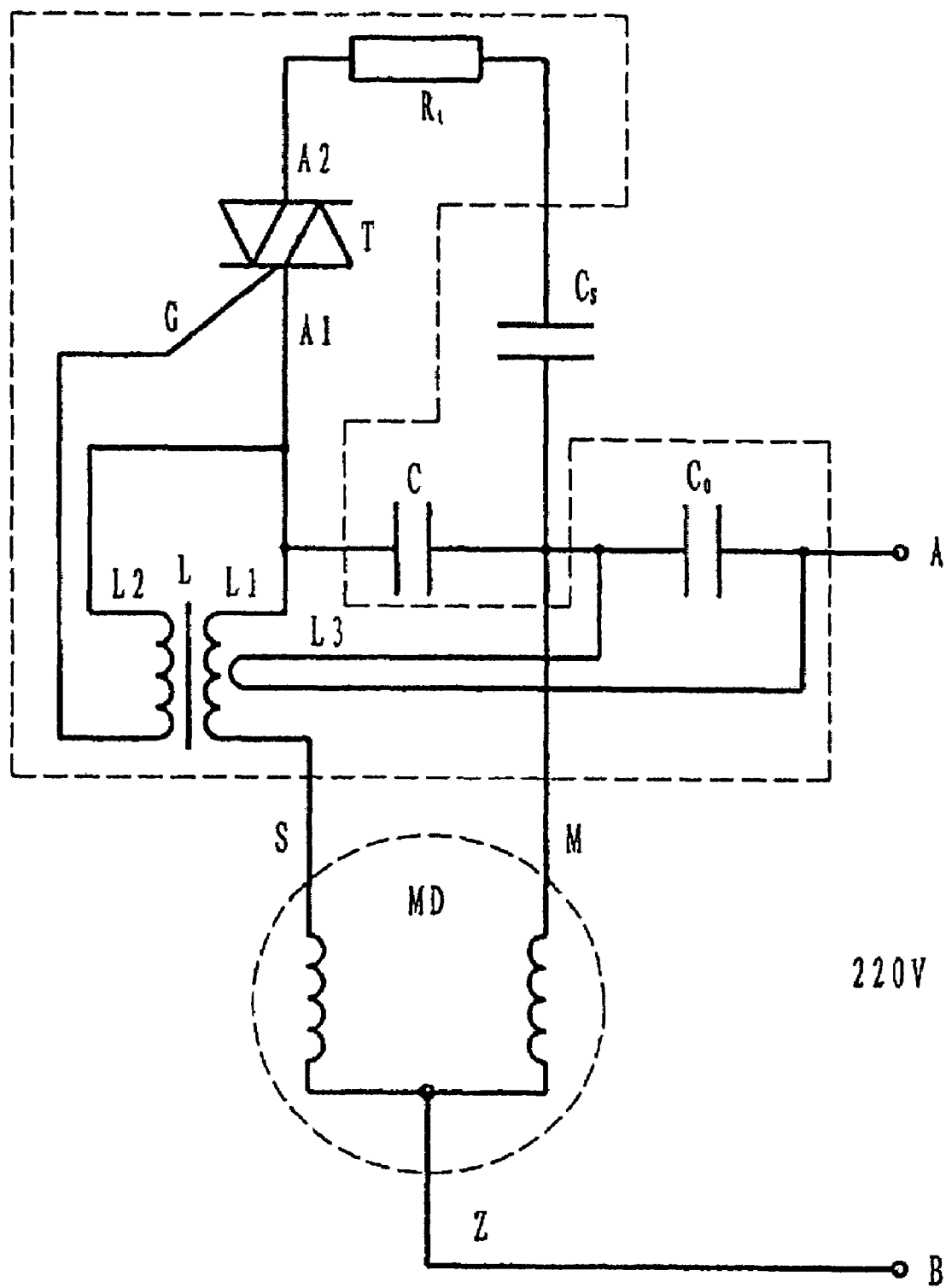
FIG. 1 is an electrical schematic diagram of a starter circuit constructed in accordance with a first embodiment.

As shown in FIG. 1, one terminal of a motor starting capacitor $C_s$ can be connected to a terminal of a PTC resistor Rt. The other terminal of the motor starting capacitor $C_s$ can be connected to a terminal of a permanently operating capacitor C, a terminal of a second primary coil L3, a terminal of a gate capacitor $C_0$, and the outlet terminal M of a primary winding of the motor MD.

A triac T can include a first electrode A1, a second electrode A2, and a gate electrode G. The triac T can be incorporated in to the starting circuit in the orientation illustrated in FIGS. 1 and 2.

Figure 2:
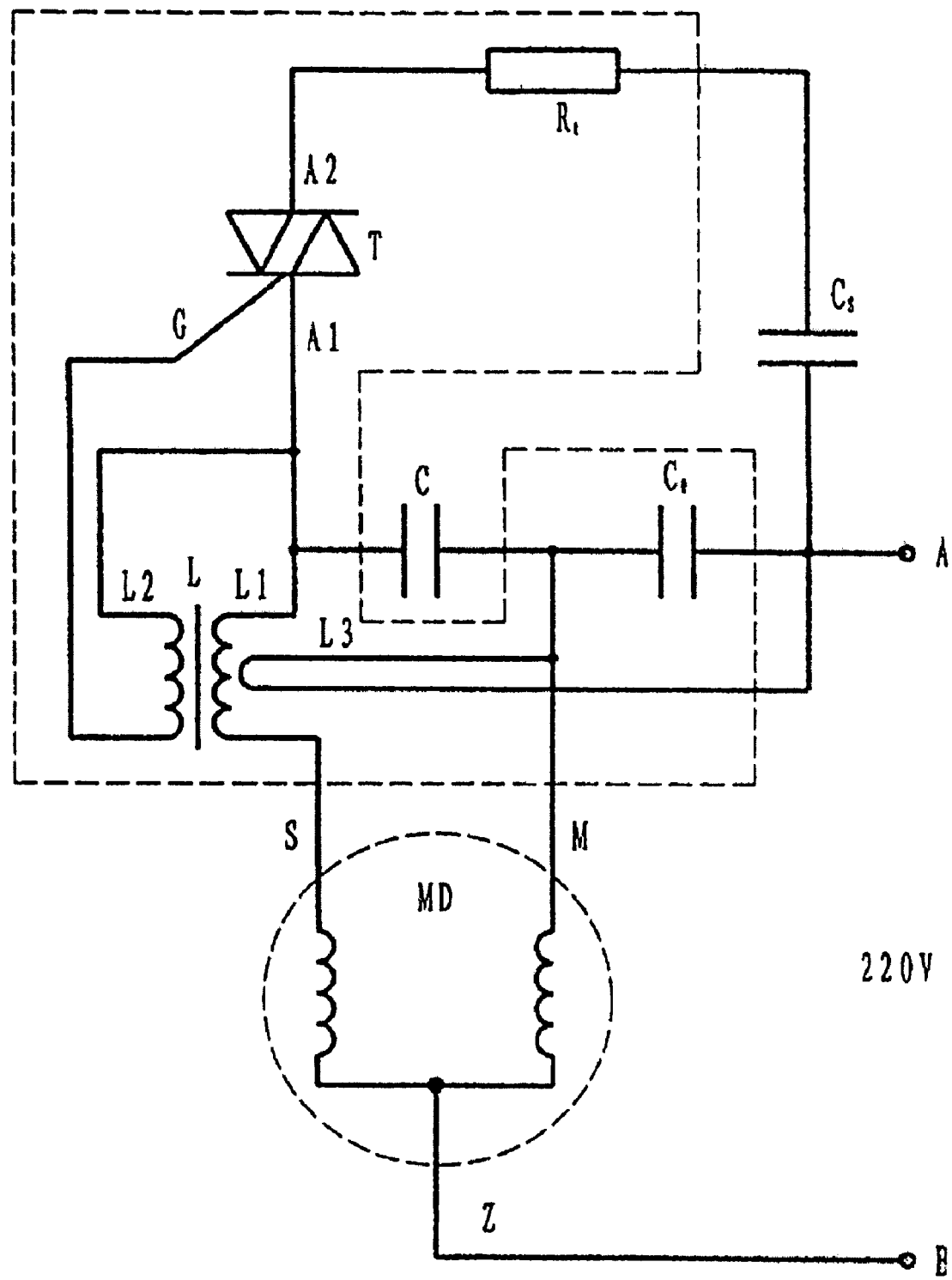
FIG. 2 is an electrical schematic diagram of a second embodiment.

As shown in FIG. 2, in some embodiments, one terminal of the motor starting capacitor $C_s$ can be connected to a terminal of the PTC resistor RT. The other terminal of the motor starting capacitor $C_s$ can be connected to the power input terminal A, one terminal of the gate capacitor $C_0$, and one terminal of the second primary coil L3.

In all of the above-noted embodiments, the combined outlet terminal Z of the primary and secondary windings of the motor MD can be connected to the power input terminal B.

Further, in the above embodiments, the variation of current in the primary coil L1 of the current mutual-inductor L is specific, and the phase relationship between that current and the current in the motor starting circuit is specific, depending on the motor MD. By choosing from above embodiments as appropriate, the phase relationship between the gating current in the secondary coil L2 of the current mutual-inductor L and the current in the motor starting circuit can be optimal, and optimal current variation characteristic can be obtained, so as to trigger the triac T, which can be connected in series in the motor starting circuit.

By choosing a current mutual-inductor L with appropriate parameters, the triac T can be triggered during motor startup but will not triggered during normal operation of the motor MD, thereby the motor starting circuit can be controlled to work only during motor startup. The current mutual-inductor L in the circuit can be chosen and adjusted by choosing the numbers of windings of primary and secondary coils L1, L2 and an iron core or magnetic core with specific performance as appropriate.

Within a short time after the motor rotor starts to speed up, the motor MD can ensure the triac T switches from gate-on state to gate-off state, i.e., the current output from the current mutual-inductor L must drop automatically to a level that the triac T can't be triggered, so as to disconnect the starting circuit and accomplish motor startup.

As shown in the drawings, at the time the motor MD begins to start, the starting current in primary winding of the motor MD is high, but the current in the secondary winding of the motor MD is low. The current output from the current mutual-inductor L triggers the triac T under the domination of the second primary coil L3, and thereby the starting circuit begins to work, causing the current in secondary winding of the motor MD to increase quickly and the current contribution from the first primary coil L1 of the current mutual-inductor L to the current output from the secondary winding takes the dominant role. As the current output from secondary coil L2 of the current mutual-inductor L increases quickly, it triggers the triac T in the starting circuit, which causes the starting circuit to enter a working state. As the high starting current from secondary winding of the motor MD passes through the PTC resistor Rt in the starting circuit, the PTC resistor Rt generates heat quickly and thereby the resistance increases quickly. When the temperature in the PTC resistor Rt reaches to its Courier point, the resistance reaches to the maximum value, which can be enough to disconnect the motor starting circuit. Now, the motor MD enters into normal operation state. After that, as regulated by the foresaid principle for selection and adjustment of the current mutual-inductor L, the current output from secondary coil L2 of the current mutual-inductor can't trigger the triac T. Therefore, the motor starting circuit is disconnected completely, and the PTC resistor Rt loses current and thereby its temperature begins to drop.

When the temperature in the PTC resistor Rt drops to a value near the temperature in the working environment, it is impossible for the triac T in the starting circuit to be triggered by the current output from secondary coil L2 of the current mutual-inductor L, since the motor is in normal operation state. As the result, there is no current passing through the PTC resistor Rt, and thereby the PTC resistor Rt will not generate heat before the motor MD stops and restarts; in that way, the motor starting circuit will keep in that state, until the motor stops.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. An inductive contactless starter for single-phase AC motor, the motor comprising a stator composed of at least a primary winding and a secondary winding, a permanently operating capacitor connected between outlet terminals of the primary and secondary windings, the inductive contactiess starter comprising a current mutual-inductor composed of two primary coils and a secondary coil, a gate capacitor, a triac, and a PTC resistor, wherein a first terminal of the secondary coil of the current mutual-inductor is connected to a gate electrode of the triac, and a second terminal of the secondary coil is connected to a first electrode of the triac, a terminal of the permanently operating capacitor, and a terminal of the first primary coil of the current mutual-inductor, a second terminal of the first primary coil of the current mutual-inductor being connected to an outlet terminal of the secondary winding of the motor, a terminal of the second primary coil of the current mutual-inductor being connected to a power input terminal and a terminal of the gate capacitor, a second terminal of the second primary coil of the current mutual-inductor being connected to an outlet terminal of the primary winding of the motor, a second terminal of the permanently operating capacitor, and a second terminal of the gate capacitor, and wherein a first terminal of the PTC resistor is connected to a second electrode of the triac, a second terminal of the PTC resistor being connected to a terminal of a motor starting capacitor.

* * * * *

UNITED STATES PATENT AND TRADEMARK OFFICE
CERTIFICATE OF CORRECTION

PATENT NO. : 7,391,179 B2
APPLICATION NO. : 11/579245
DATED : June 24, 2008
INVENTOR(S) : Yunwen Zhao It is certified that error appears in the above-identified patent and that said Letters Patent is hereby corrected as shown below:

At column 5, line 6 (Approx.), in Claim 1, delete "contactiess" and insert -- contactless --, therefor.

At column 5, line 15 (Approx.), in Claim 1, delete "mutual-inductor,a" and insert -- mutual-inductor, a --, therefor. (Consider Space)

Signed and Sealed this

Twenty-fourth Day of February, 2009

JOHN DOLL
*Acting Director of the United States Patent and Trademark Office*